United States Patent
Thrush et al.

(10) Patent No.: US 11,465,513 B2
(45) Date of Patent: Oct. 11, 2022

(54) POWER DISTRIBUTION UNIT HAVING CONTACTOR WITH INTEGRATED PRE-CHARGE CIRCUIT

(71) Applicants: TE Connectivity Services GmbH, Schaffhausen (CH); TE CONNECTIVITY BRASIL INDUSTRIA DE ELECTRONICOS LTDA, Braganca Paulista (BR)

(72) Inventors: Roger Lee Thrush, Clemmons, NC (US); William A. Russell, Jr., Walkertown, NC (US); Pedram Gharghabi, Jamestown, NC (US); Amadeu Luiz Fazani Cavallieri, Campinas (BR); Albert Yong Lee, Greensboro, NC (US); Dinesh L. Hemnani, Greensboro, NC (US); Bruce Toepfer, High Point, NC (US)

(73) Assignees: TE Connectivity Solutions GmbH; TE Connectivity Brasil Industria DE Electronicos LTDA

( * ) Notice: Subject to any disclaimer, the term of this patent is extended or adjusted under 35 U.S.C. 154(b) by 104 days.

(21) Appl. No.: 17/025,165

(22) Filed: Sep. 18, 2020

(65) Prior Publication Data
US 2022/0089037 A1     Mar. 24, 2022

(51) Int. Cl.
| | | |
|---|---|---|
| *B60L 15/20* | (2006.01) |
| *B60L 1/00* | (2006.01) |
| *B60L 58/10* | (2019.01) |
| *B60L 50/51* | (2019.01) |
| *B60L 50/40* | (2019.01) |

(52) U.S. Cl.
CPC ............. *B60L 15/2072* (2013.01); *B60L 1/00* (2013.01); *B60L 50/40* (2019.02); *B60L 50/51* (2019.02); *B60L 58/10* (2019.02)

(58) Field of Classification Search
CPC ...... B60L 15/2072; B60L 58/10; B60L 50/40; B60L 50/51; B60L 1/00
See application file for complete search history.

(56) References Cited

U.S. PATENT DOCUMENTS

| | | |
|---|---|---|
| 8,203,810 B2 | 6/2012 | Bryan et al. |
| 9,573,474 B2 | 2/2017 | Mensah-Brown et al. |
| 9,673,617 B2 | 6/2017 | Ngo |

(Continued)

FOREIGN PATENT DOCUMENTS

| | | | | |
|---|---|---|---|---|
| CN | 212771599 U | * | 3/2021 | ........... D06F 103/54 |
| EP | 2822132 A1 | * | 1/2015 | ........... B60L 11/1803 |

*Primary Examiner* — Jared Fureman
*Assistant Examiner* — Duc M Pham

(57) ABSTRACT

A power distribution unit includes a housing, a main contactor in a main cavity of the housing, and a pre-charge assembly in a secondary cavity of the housing. The main contactor includes first and second fixed contacts and a movable contact configured to electrically connect the first and second fixed contacts in a mated position. The main contactor includes a coil assembly energized to move the movable contact. The pre-charge assembly includes a pre-charge resistor and a pre-charge switch coupled to the pre-charge resistor. The power distribution unit includes a controller received in the housing. The controller includes a main contactor driver for powering the main contactor and a pre-charge driver for powering the pre-charge switch.

20 Claims, 3 Drawing Sheets

(56) References Cited

U.S. PATENT DOCUMENTS

| | | |
|---|---|---|
| 9,925,878 B2 | 3/2018 | Hashim et al. |
| 2018/0043783 A1 | 2/2018 | Tabatowski-Bush et al. |
| 2018/0043847 A1 | 2/2018 | Burkman et al. |
| 2018/0272870 A1* | 9/2018 | Burkman .............. B60L 3/0046 |

* cited by examiner

POWER DISTRIBUTION UNIT HAVING CONTACTOR WITH INTEGRATED PRE-CHARGE CIRCUIT

BACKGROUND OF THE INVENTION

The subject matter herein relates generally to power distribution units.

Certain electrical applications, such as HVAC, power supply, locomotives, elevator control, motor control, aerospace applications, electric vehicles, hybrid electric vehicles, fuel-cell vehicles, charging systems, and the like, utilize electrical contactors to control power distribution for the devices. For example, vehicles using a high-voltage battery pack generally include a main contactor to switch battery power to the power electronic components. There is generally some capacitance associated with the power electronics circuitry. This capacitance can create large inrush currents when closing the main contactor. These large inrush currents can create an arc across the contacts causing damage to or reducing the operating life of the contacts and creating sparks. To eliminate the large inrush currents and to protect the main contactor, a pre-charge circuit is often used with the main contactor.

A typical pre-charge circuit includes a pre-charge contactor in series with a pre-charge resistor. During power-up of the vehicle, the pre-charge contactor is closed and current flows through the pre-charge contactor and the pre-charge resistor. When a desired voltage is reached, the main contactor may be switched on and the pre-charge contactor may be switched off. The various components of conventional power distribution units are grouped together and electrically connected together using wires and bus bars. For example, the individual components are separately mounted to a common frame, such as using fasteners. Wires are coupled between the components, such as using terminals, contacts or connectors between the various components. Assembly of the power distribution unit is time consuming, requiring separate mechanical and electrical connections for each of the components. Additionally, the many components occupy a significant space within the vehicle.

A need remains for a power distribution unit that may be assembled in a cost effective and reliable manner.

BRIEF DESCRIPTION OF THE INVENTION

In accordance with embodiments herein, a power distribution unit is provided. The power distribution unit includes a housing having walls defining a main cavity and a secondary cavity. The power distribution unit includes a main contactor received in the main cavity of the housing. The main contactor includes first and second fixed contacts and a movable contact movable between a mated position and an unmated position. The movable contact engages the first and second fixed contacts to electrically connect the first and second fixed contacts in the mated position. The movable contact is separated from the first and second fixed contacts in the unmated position. The main contactor includes a coil assembly energized to move the movable contact between the unmated position and the mating position. The power distribution unit includes a pre-charge assembly received in the secondary cavity of the housing. The pre-charge assembly includes a pre-charge resistor and a pre-charge switch coupled to the pre-charge resistor. The power distribution unit includes a controller received in the housing. The controller includes a main contactor driver for powering the main contactor. The controller includes a pre-charge driver for powering the pre-charge switch.

In another embodiment, a power distribution unit is provided. The power distribution until includes a housing having walls defining a main cavity and a secondary cavity. The power distribution until includes a main contactor received in the main cavity of the housing. the main contactor includes first and second fixed contacts and a movable contact movable between a mated position and an unmated position. The movable contact engages the first and second fixed contacts to electrically connect the first and second fixed contacts in the mated position. The movable contact is separated from the first and second fixed contacts in the unmated position. The main contactor includes a coil assembly energized to move the movable contact between the unmated position and the mating position. The power distribution until includes a pre-charge assembly received in the secondary cavity of the housing. The pre-charge assembly includes a pre-charge resistor and a pre-charge switch coupled to the pre-charge resistor and configured to be coupled to a pre-charge capacitor. The power distribution until includes a controller received in the housing. The controller includes a trigger connector electrically coupled to a control circuit board. The trigger connector is configured to receive a trigger signal from a vehicle controller. The controller includes a main contactor driver for powering the main contactor. The controller includes a pre-charge driver for powering the pre-charge switch. The controller includes a microcontroller operably coupled to the main contactor driver and operably coupled to the pre-charge driver. The controller activates the pre-charge driver upon receiving the trigger signal to charge the pre-charge capacitor prior to activating the main contactor driver.

In a further embodiment, a vehicle battery system is provided. The vehicle battery system includes a high voltage battery pack having a positive battery terminal and a negative battery terminal. The vehicle battery system includes an inverter configured to convert DC power from the high voltage battery pack to AC power for operating an electric motor of a vehicle. The vehicle battery system includes a power distribution unit between the high voltage battery pack and the inverter. The power distribution unit includes a housing having walls defining a main cavity and a secondary cavity. The power distribution unit includes a main contactor received in the main cavity of the housing. The main contactor includes first and second fixed contacts and a movable contact movable between a mated position and an unmated position. The movable contact engages the first and second fixed contacts to close the main contactor and electrically connect the high voltage battery pack with the inverter. The movable contact is separated from the first and second fixed contacts in the unmated position to open the main contactor. The main contactor includes a coil assembly energized to move the movable contact between the unmated position and the mating position. The power distribution unit includes a pre-charge assembly received in the secondary cavity of the housing. The pre-charge assembly includes a pre-charge resistor and a pre-charge switch coupled to the pre-charge resistor and configured to be coupled to a pre-charge capacitor. The power distribution unit includes a controller received in the housing. The controller is configured to receive a trigger signal from a vehicle controller. The controller includes a main contactor driver for powering the main contactor. The controller includes a pre-charge driver for powering the pre-charge switch. The controller includes a microcontroller operably coupled to the main contactor driver and operably coupled to the pre-charge driver. The controller activates the pre-charge driver upon receiving the trigger signal to charge the pre-charge capacitor prior to activating the main contactor driver.

DETAILED DESCRIPTION OF THE INVENTION

Figure 1:
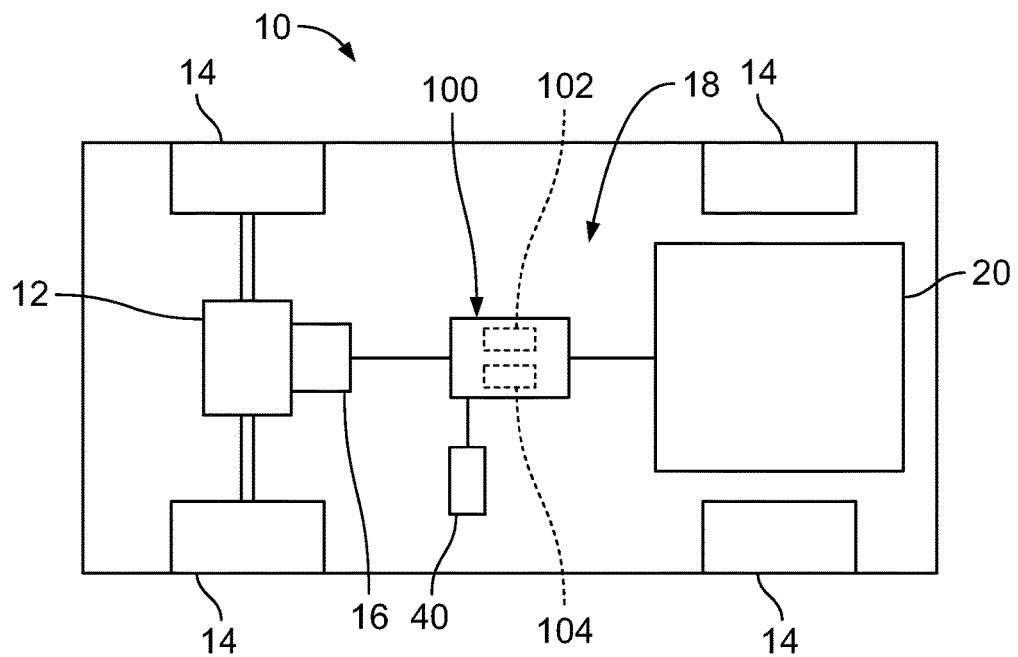
FIG. 1 is a schematic illustration of a vehicle having a power distribution unit in accordance with an exemplary embodiment.

FIG. 1 is a schematic illustration of a vehicle 10 having a power distribution unit 100 in accordance with an exemplary embodiment. The vehicle 10 may be an electric vehicle. In other various embodiments, the vehicle 10 may be a hybrid electric vehicle, such as including an engine (not shown). The vehicle 10 includes one or more electric motors 12 for driving wheels 14 of the vehicle 10. An inverter 16 is provided for controlling power to the electric motor 12.

The vehicle 10 includes a vehicle battery system 18 for supplying power for the vehicle 10, such as for the electric motor 12 or other vehicle systems or components. The power distribution unit 100 is part of the vehicle battery system 18. The vehicle battery system 18 includes a battery pack 20, such as a high voltage battery pack 20 for powering the electric motor 12. The battery pack 20 provides a high voltage DC output. The battery pack 20 is electrically connected to the power distribution unit 100. The power distribution unit 100 is also electrically connected to the electric motor 12. In addition to providing energy for the electric motor 12, the battery pack 20 may provide energy for other vehicle electrical systems, such as for heaters, compressors, low voltage DC components, and the like. The vehicle battery system 18 may include other system components, such as a DC-to-DC converter. The electric motor 12 may operate as a generator to recharge the battery pack 20 to provide fuel economy benefits and reduce pollutant emissions.

The power distribution unit 100 is provided between the battery pack 20 and the inverter 16. The power distribution unit 100 controls power supply between the battery pack 20 and the inverter 16. The power distribution unit 100 includes a main contactor 102 and a pre-charge assembly 104 integrated with the main contactor 102. The main contactor 102 is an electrical switch or relay that safely connects and disconnects one or more electrical circuits to protect the flow of power through the system. The precharge assembly is used for pre-charging a capacitor of the vehicle battery system 18 and includes an electrical switch or relay and resistor that safely pre-charges the capacitor. The power distribution unit 100 may be used in other various applications other than the vehicle, such as HVAC, power supply, locomotives, elevator control, motor control, aerospace applications, charging systems, and the like.

In an exemplary embodiment, the vehicle 10 includes a vehicle controller 40 electrically coupled to the power distribution unit 100. The vehicle controller 40 sends trigger signals to the power distribution unit 100 for operating the power distribution unit 100. The power distribution unit 100 controls the power supply to the inverter 16. For example, the power distribution unit 100 includes drivers for opening and closing switches to supply power to the inverter 16. The drivers are operated based on the trigger signals from the vehicle controller 40. In an exemplary embodiment, multiple switches are operated based on a single trigger signal transmitted from the vehicle controller 40 to the power distribution unit 100. The trigger signals may be based on a request for battery power, such as turning a key or pressing a start button on the vehicle 10, plugging in a charger, such as a phone charger, operating another vehicle system, such as the heating/cooling system of the vehicle 10, or other request for vehicle power.

Figure 2:
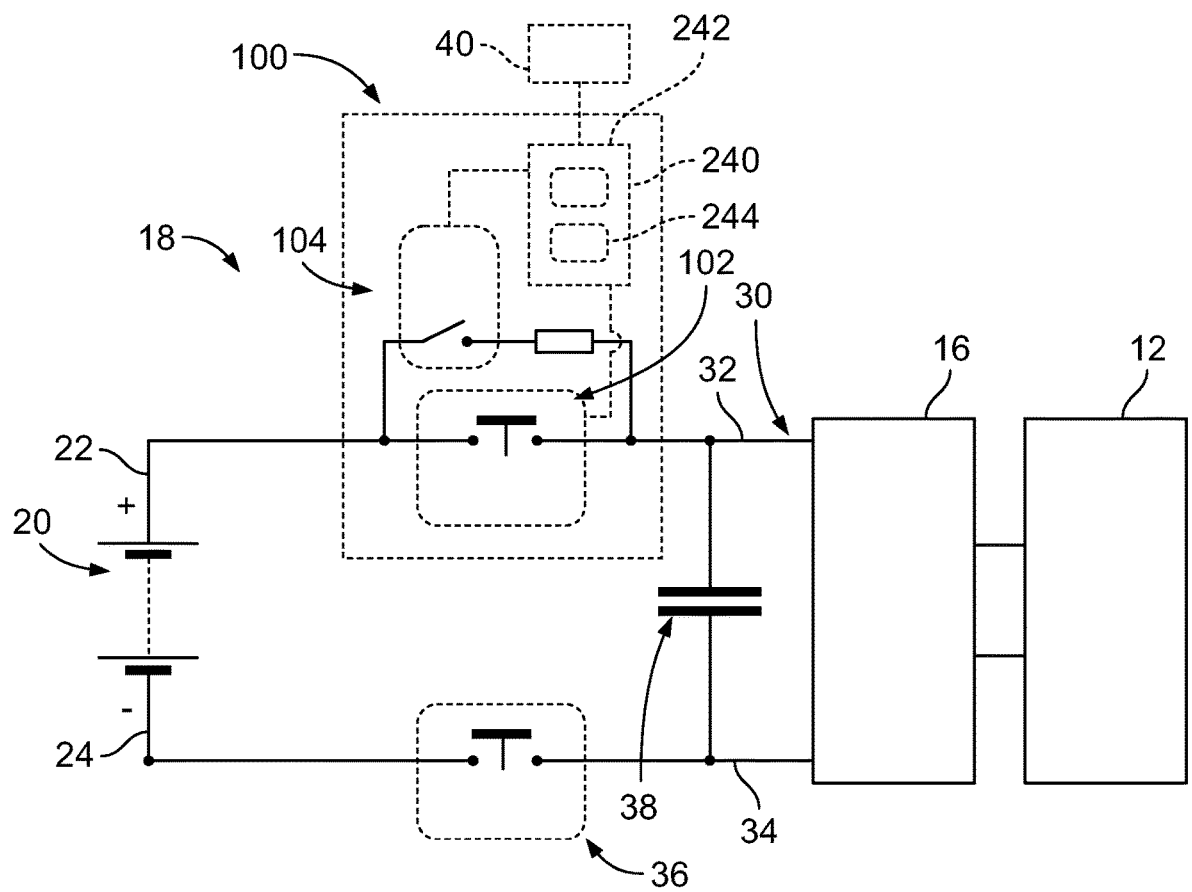
FIG. 2 is a diagram of the power distribution unit of a vehicle battery system in accordance with an exemplary embodiment.

FIG. 2 is a diagram of the power distribution unit 100 of the vehicle battery system 18. The power distribution unit 100 is electrically connected between the battery pack 20 and a load 30, such as the inverter 16 for the electric motor 12. The vehicle battery system 18 includes a positive circuit 32 and a negative circuit 34. The positive circuit 32 is coupled to a positive battery terminal 22 of the battery pack 20. The negative circuit 34 is coupled to a negative battery terminal 24 of the battery pack 20. The main contactor 102 and the pre-charge assembly 104 of the power distribution unit 100 are electrically coupled to the positive circuit 32. A negative contactor 36 is coupled to the negative circuit 34. A capacitor 38 is coupled between the positive circuit 32 and the negative circuit 34.

In an exemplary embodiment, the main contactor 102 may default to an open position such that the battery pack 20 is disconnected from the load 30. In the open position, the battery pack 20 cannot provide power to the load 30. A signal or request to close the main contactor 102 may be issued by the vehicle controller 40, such as in response to an ignition on request by the driver or other event, such as a charger being connected or whenever it is required for the battery pack 20 to be connected to other devices. The power distribution unit 100 includes a controller 240 for controlling power supply through the power distribution unit 100. The controller 240 includes a main contactor driver 242 to control opening and closing of the main contactor 102. The controller 240 includes a pre-charge driver 244 to control opening and closing of the pre-charge assembly 104. Communication of the open and close signals may be via a discrete signal connector or serial communications bus connection between the vehicle controller 40 and the controller 240 of the power distribution unit 100. The pre-charge assembly 104 is used to charge the capacitor 38 prior to closing the main contactor 102. The pre-charge assembly 104 is activated prior to the main contactor 102 to charge the capacitor 38 prior to activating the main contactor 102. For example, the controller activates the pre-charge driver 244 prior to activating the main contactor driver 242, such as a predetermined time before activating the main contactor driver 242 (for example, approximately 100 ms). The pre-charge assembly 104 minimizes inrush current through the main contactor 102 when the main contactor 102 is switched on by minimizing the voltage difference. The pre-charge assembly reduces or eliminates problems with closing the main contactor 102 due to the large inrush current. For example, the pre-charge assembly 104 may reduce arcing across the main contactor 102 during switching. The current flowing through the pre-charge assembly 104 may be limited to a value substantially less than a rated current for the load being pre-charged. For example, the current may be limited to a value of 5 Amps or less while the rated load current may be hundreds of amps. Limiting the current affects the rate of voltage increase of the load 30. The time required for the capacitor 38 to charge may be set to a predetermined amount of time, such as approximately 100 ms. In an exemplary embodiment, the controller 240 controls the pre-charge sequence and takes the control responsibility away from the vehicle controller 40. Taking the responsibility away from the vehicle controller 40 reduces the overhead of the main electronic control unit of the vehicle. The controller 240 controls the sequence of closing the pre-charge switch allowing the capacitor 38 to charge. The controller 240 monitors the capacitor charge to control opening of the pre-charge switch and to control closing of the main contactor 102. The controller 240 may use control algorithms to determine when the capacitor has enough charge (for example, based on timing or based on current sensing). When the capacitor 38 has sufficient charge, the controller 240 energizes the main contactor 102 and turns off the pre-charge switch. The controller 240 protects the main contactor 102 from damage.

The pre-charge assembly 104 is placed in parallel with the main contactor 102. One side of the pre-charge assembly 104 is electrically connected to the battery pack 20. Another side of the pre-charge assembly 104 is electrically connected to the capacitor 38 and the load 30. The controller 240 of the pre-charge assembly 104 controls operation of the pre-charge assembly 104, such as providing control signals to activate the pre-charge assembly 104 and to activate the main contactor 102 after the capacitor 38 is charged. The control signal may be a signal to control a switching device (e.g., gate drive of a MOSFET). The control signal may be a voltage or current applied to the switching device. The control signal may be a voltage or current applied to a coil assembly.

Figure 3:
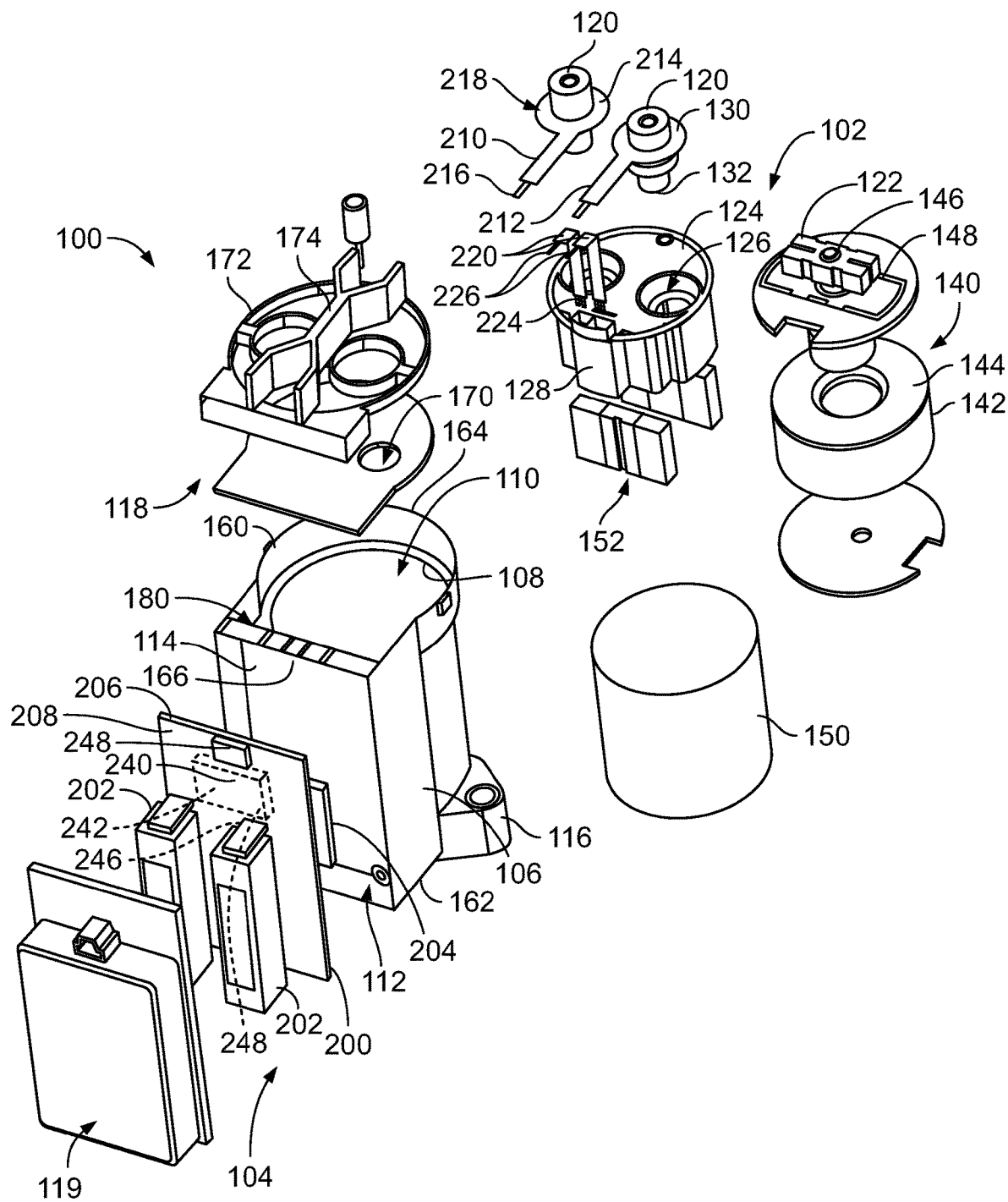
FIG. 3 is an exploded view of the power distribution unit in accordance with an exemplary embodiment.

FIG. 3 is an exploded view of the power distribution unit 100 in accordance with an exemplary embodiment. The power distribution unit 100 includes a housing 106 holding the main contactor 102, the pre-charge assembly 104, and the controller 240. The housing 106 includes walls 108 forming a main cavity 110 and a secondary cavity 112. The main cavity 110 holds the main contactor 102 and the secondary cavity 112 holds the pre-charge assembly 104. The main cavity 110 and the secondary cavity 112 are both integrated within the common housing 106. The housing 106 is a single-piece housing with the walls 108 forming the main cavity 110 and the walls 108 forming the secondary cavity 112 being co-molded as a single, unitary, monolithic structure. In the illustrated embodiment, the main cavity 110 has a circular cross-section and the secondary cavity has a rectangular cross-section; however, the cavities may have other shapes in alternative embodiments.

In an exemplary embodiment, one of the walls 108 of the housing 106 is a separating wall 114 located between the main cavity 110 and the secondary cavity 112. The separating wall 114 defines a portion of the main cavity 110 and a portion of the secondary cavity 112. A first side of the separating wall 114 faces the main cavity 110 and a second side of the separating wall 114 faces the secondary cavity 112. The housing 106 includes mounting flanges 116, such as at the bottom, configured to be mounted to a structure within the vehicle 10.

The housing 106 includes a lid 118 for closing the main cavity 110 and a cover 119 for covering the secondary cavity 112. Optionally, the lid 118 and/or the cover 119 may be sealed to the walls 108 of the housing 106.

The power distribution unit 100 includes fixed contacts 120 received in the main cavity 110 and a movable contact 122 movable within the main cavity 110 between a mated position and an unmated position. The movable contact 122 engages the fixed contacts 120 to electrically connect the fixed contacts 120 in the mated position. The fixed contacts 120 are fixed to the housing 106. For example, the fixed contacts 120 may be coupled to a contact holder 124 received in the main cavity 110. The contact holder 124 includes openings 126 that receive the fixed contacts 120. The contact holder 124 defines an enclosure 128. The fixed contacts 120 extend into the enclosure 128. The movable contact 122 is received in the enclosure 128 and configured to engage the fixed contacts 120 when the main contactor 102 is operated.

The fixed contacts 120 each include a terminating end 130 and a mating end 132. The terminating end 130 is configured to be terminated to another component, such as a wire or a busbar, such as a line in or a line out busbar. In an exemplary embodiment, the terminating end 130 is exposed at the exterior of the power distribution unit 100 for terminating to the other component. The terminating end 130 may be threaded to receive a nut. In the illustrated embodiment, the terminating end 130 extends through the lid 118 and is located above the lid 118. The mating end 132 is located within the main cavity 110 for mating engagement with the movable contact 122, such as when the power distribution unit 100 is energized. In the illustrated embodiment, the mating end 132 is generally flat for engaging the movable contact 122. However, the mating end 132 may have other shapes in alternative embodiments, such as a rounded shape to form a mating bump at the mating end 132 for mating with the movable contact 122.

The power distribution unit 100 includes a coil assembly 140 in the main cavity 110 operated to move the movable contact 122 between the unmated position and the mated position. The coil assembly 140 includes a winding or coil 142 wound around a core 144 to form an electromagnet. The coil assembly 140 includes a plunger 146 coupled to the core 144. The movable contact 122 is coupled to the plunger 146 and is movable with the plunger 146 when the coil assembly 140 is operated. The coil assembly 140 includes a spring 148 for returning the movable contact 122 to the unmated position when the coil assembly 140 is deenergized. In an exemplary embodiment, the coil assembly 140 includes an outer core 150 configured to be received in the main cavity 110. The coil 142 is configured to be received in the outer core 150.

In an exemplary embodiment, the power distribution unit 100 includes an arc suppressor 152 for suppressing electrical arc of the electrical circuit. The arc suppressor 152 is located in the cavity 110 of the housing 106. Optionally, the arc suppressor 152 may be located in the contact holder 124, such as in or near the enclosure 128. In an exemplary embodiment, the arc suppressor 152 includes magnets creating magnetic fields in the enclosure 128 for suppressing arc created between the movable contact 122 and the fixed contacts 120. In an exemplary embodiment, the contact holder 124 may be sealed and may be filled with an inert gas for arc suppression.

The housing 106 holds the components of the power distribution unit 100. The housing 106 includes a first end 160 and a second end 162 opposite the first end 160. The first end 160 may be a top of the housing 106 and the second end 162 may be a bottom of the housing 106. The housing 106 includes a first side 164 and a second side 166 opposite the first side 164. The main cavity 110 is provided at the first side 164. The secondary cavity 112 is provided at the second side 166. In the illustrated embodiment, the main cavity 110 is open at the first end 160. The main cavity 110 receives the main contactor 102 through the open first end 160. The lid 118 is coupled to the housing 106 at the first end 160 to close the main cavity 110. In the illustrated embodiment, the secondary cavity 112 is open at the second side 166. The secondary cavity 112 receives the pre-charge assembly 104 through the open second side 166. In an exemplary embodiment, the secondary cavity 112 holds the controller 240. The cover 119 is coupled to the housing 106 at the second side 166 to enclose the pre-charge assembly 104 in the secondary cavity 112 and retain the pre-charge assembly 104 in the secondary cavity 112. The pre-charge assembly 104 is housed in the same housing 106 with the main contactor 102. The controller 240 is housed in the same housing 106 with the main contactor 102. The power distribution unit 100 does not require a second housing for the pre-charge assembly 104 or the controller 240, thus reducing part count and assembly time.

The lid 118 is configured to be coupled to the housing 106 at the first end 160. The lid 118 includes openings 170 that receive the fixed contacts 120. The openings 170 are aligned with the openings 126. The lid 118 is shaped to fit in the housing 106, such as in the main cavity 110. The lid 118 is manufactured from a dielectric material, such as a plastic material. In an exemplary embodiment, the lid 118 includes an isolator 172 having isolating walls 174 configured to electrically isolate the terminating ends 130 of the fixed contacts 122. The isolator 172 is manufactured from a dielectric material, such as a plastic material.

In an exemplary embodiment, the housing 106 includes contact channels 180 between the main cavity 110 and the secondary cavity 112. The contact channels 180 are located in the separating wall 114 in the illustrated embodiment. The contact channels 180 allow contacts to pass between the main cavity 110 and the secondary cavity 112.

The pre-charge assembly 104 is received in the secondary cavity 112. The pre-charge assembly 104 includes a control circuit board 200, one or more pre-charge resistors 202 coupled to the control circuit board 200, and a pre-charge switch 204 coupled to the control circuit board 200. The control circuit board 200 forms a portion of the controller 240. For example, the pre-charge assembly 104 is integrated with the controller 240.

The controller 240 includes the main contactor driver 242 to control the main contactor 102 and the pre-charge driver 244 to control the pre-charge assembly 104. The controller 240 includes a microcontroller 246 for controlling the main contactor driver 242 and the pre-charge driver 244. The microcontroller 246 may be an integrated circuit (IC) designed to govern specific operation of the main contactor driver 242 and the pre-charge driver 244. The microcontroller 246 may include a processor, a memory and input/output (I/O) peripherals on a single chip. The microcontroller 246, the main contactor driver 242 and the pre-charge driver 244 may be surface mounted to the control circuit board 200. For example, the main contactor driver 242 and the pre-charge driver 244 may be soldered to pads on the control circuit board 200. The control circuit board 200 supports the microcontroller 246, the main contactor driver 242 and the pre-charge driver 244 in the secondary cavity 112. In other various embodiments, the main contactor driver 242 and/or the pre-charge driver 244 may be integrated with the microcontroller 246 on a single chip. In various embodiments, the controller 240 may include an A-to-D converter for converting between analog signals and digital signals, such as for controlling the main contactor driver 242 and the pre-charge driver 244.

In an exemplary embodiment, the controller 240 includes a trigger connector 248 electrically coupled to the control circuit board 200. The trigger connector 248 is configured to receive a trigger signal from the vehicle controller 40 (shown in FIG. 1). For example, an electrical connector may be coupled to the trigger connector 248. The trigger connector 248 may be a plug connector or a receptacle connector in various embodiments. The trigger signals are used by the controller 240 to operate the main contactor driver 242 and the pre-charge driver 244. For example, the trigger signals are used to activate the pre-charge driver 244 upon receiving the trigger signal to charge the pre-charge capacitor 38 prior to activating the main contactor driver 242.

In an exemplary embodiment, the pre-charge switch 204 is a semiconductor switch. For example, the pre-charge switch 204 may be a MOSFET. In other various embodiments, the pre-charge switch 204 may be a triac or an insulated-gate bipolar transistor (IGBT). In other various embodiments, the pre-charge switch may be a mechanical relay. The pre-charge switch 204 is coupled to a first side 206 of the control circuit board 200. The pre-charge resistors 202 are coupled to a second side 208 of the control circuit board 200. However, in alternative embodiments, the pre-charge switch 204 and the pre-charge resistors 202 may be coupled to the same side of the control circuit board 200. The pre-charge switch 204 and the pre-charge resistors 202 may be surface mounted to the control circuit board 200. For example, the pre-charge switch 204 and the pre-charge resistors 202 may be soldered to pads on the control circuit board 200. The control circuit board 200, pre-charge resistors 202, and pre-charge switch 204 are loaded into the secondary cavity 112 of the housing 106 and secured in the secondary cavity 112 by the cover 119. The control circuit board 200 supports the pre-charge resistors 202 and the pre-charge switch 204 in the secondary cavity 112. The walls 108 of the housing 106 and the cover 119 enclose the pre-charge assembly 104. Optionally, a seal may be provided between the cover 119 and the housing 106.

The power distribution unit 100 includes first and second pre-charge connection terminals 210, 212. The first and second pre-charge connection terminals 210, 212 are received in the corresponding contact channels 180. The first and second pre-charge connection terminals 210, 212 each extends between a first end 214 and a second end 216. The first end 214 is coupled to the corresponding fixed contact 120. For example, the first end 214 may include a ring 218 that receives the terminating end 130. A nut may couple the first end 214 to the fixed contact 120. A wire or busbar is configured to be terminated to the terminating end 130 of the fixed contact 120 and/or the first end 214 of the pre-charge connection terminal 210, 212. The second end 216 is coupled to the control circuit board 200. For example, the second end 216 may include a pin or tail configured to be press-fit into the control circuit board 200. The first and second pre-charge connection terminals 210, 212 supply power to a power circuit of the control circuit board 200 and the pre-charge driver 244. The pre-charge driver 244 is operated to supply the power to the pre-charge switch 204. The pre-charge switch 204 is electrically connected to the fixed contacts 120 by the pre-charge connection terminals 210, 212 without wires therebetween. Assembly of the power distribution unit 100 is quick and easy without the need for connecting individual wires or busbars between the various components. The pre-charge connection terminals 210, 212 are quickly and easily coupled to the fixed contacts 120 to supply power to the pre-charge assembly 104. For example, a voltage or current may be used to activate the pre-charge switch 204.

The power distribution unit 100 includes coil connection terminals 220. The coil connection terminals 220 are received in the corresponding contact channels 180. The coil connection terminals 220 each extends between a first end 224 and a second end 226. The first end 224 is coupled to the coil 142. The second end 226 is coupled to the control circuit board 200. The coil connection terminals 220 are electrically connected to the power circuit of the control circuit board 200. The main contactor driver 242 is activated to supply power to the coil 142 to operate the main contactor 102. The coil assembly 140 is operated by an output from the main contactor driver 242 transmitted on the coil connecting terminals 220. For example, a voltage or current may be transmitted on the coil connecting terminals 220 to activate the coil assembly 140.

Figure 4:
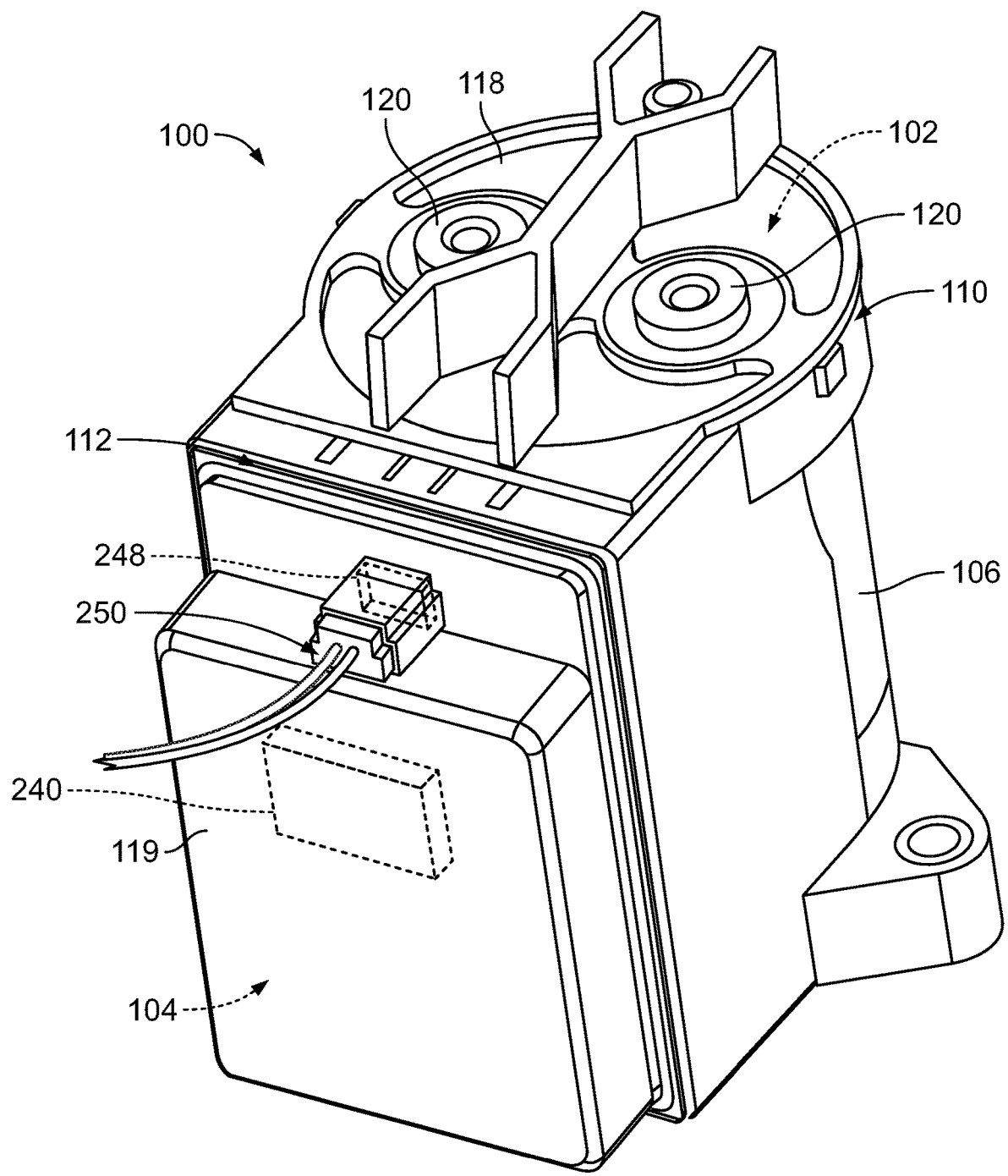
FIG. 4 is a perspective view of the power distribution unit in accordance with an exemplary embodiment.

FIG. 4 is a perspective view of the power distribution unit 100 in accordance with an exemplary embodiment. When assembled, the main contactor 102 is received in the housing 106 and the pre-charge assembly 104 is received in the housing 106. The controller 240 is received in the housing 106 to operate the main contactor 102 and the pre-charge assembly 104. The lid 118 closes the main contactor 102 in the main cavity 110. The cover 119 closes the controller 240 and the pre-charge assembly 104 in the secondary cavity 112. The fixed contacts 120 are exposed at the first end 160 for connection to power wires or busbars. The single connection supplies power to both the main contactor 102 and the pre-charge assembly 104.

The controller 240 controls power supply to the pre-charge switch 204 and the coil assembly 140. For example, the controller 240 first powers the pre-charge switch 204 to charge the capacitor 38 (shown in FIG. 1), without powering the main contactor 102. After the capacitor 38 is charged, the controller 240 turns off the pre-charge switch 204 and powers the coil assembly 140 to activate the main contactor 102. In an exemplary embodiment, an electrical connector 250 is coupled to the power distribution unit 100 to supply control or trigger signals to the controller 240. For example, the electrical connector 250 is coupled to the trigger connector 248 (shown in FIG. 3) to electrically connect to the controller 240. The control signals trigger operation of the power distribution unit 100. For example, when the control signal is received at the controller 240, the pre-charge operation is initiated and then the activation of the main contactor 102 is initiated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power distribution unit comprising:
   a housing having walls defining a main cavity and a secondary cavity;
   a main contactor received in the main cavity of the housing, the main contactor including first and second fixed contacts and a movable contact movable between a mated position and an unmated position, the movable contact engaging the first and second fixed contacts to electrically connect the first and second fixed contacts in the mated position, the movable contact being separated from the first and second fixed contacts in the unmated position, the main contactor including a coil assembly energized to move the movable contact between the unmated position and the mating position;
   a pre-charge assembly received in the secondary cavity of the housing, the pre-charge assembly including a pre-charge resistor and a pre-charge switch coupled to the pre-charge resistor; and
   a controller received in the housing, the controller including a main contactor driver for powering the main contactor, the controller including a pre-charge driver for powering the pre-charge switch.

2. The power distribution unit of claim 1, wherein the pre-charge switch is a semiconductor switch.

3. The power distribution unit of claim 1, wherein the pre-charge resistor and the pre-charge switch are mounted to a control circuit board of the controller.

4. The power distribution unit of claim 1, wherein the controller includes a microcontroller mounted to a control circuit board, the microcontroller operably coupled to the main contactor driver and operably coupled to the pre-charge driver, wherein the microcontroller activates the pre-charge driver upon receiving a trigger signal to charge the pre-charge capacitor prior to activating the main contactor driver.

5. The power distribution unit of claim 1, wherein the controller includes a trigger connector electrically coupled to a control circuit board, the trigger connector configured to receive a trigger signal from a vehicle controller, the controller including a microcontroller operably coupled to the main contactor driver and operably coupled to the pre-charge driver, wherein the microcontroller activates the pre-charge driver upon receiving the trigger signal to charge the pre-charge capacitor prior to activating the main contactor driver.

6. The power distribution unit of claim 1, wherein the main contactor driver and the pre-charge driver are mounted on a same side of a control circuit board of the controller.

7. The power distribution unit of claim 1, wherein the controller includes a power circuit on a control circuit board, the power circuit being electrically connected to the main contactor driver and being electrically connected to the pre-charge driver.

8. The power distribution unit of claim 1, wherein the pre-charge assembly includes first and second pre-charge connection terminals, the first pre-charge connection terminal coupled to the first fixed contact and coupled to a control circuit board, the second pre-charge connection terminal coupled to the second fixed contact and coupled to the control circuit board, the first and second pre-charge connection terminals being electrically coupled to the pre-charge driver, wherein the first and second pre-charge connection terminals supply power to the control circuit board for operating the pre-charge driver.

9. The power distribution unit of claim 8, further comprising coil connecting terminals coupled to the coil assembly and coupled to the control circuit board, the coil connecting terminals being electrically coupled to the main contactor driver, the coil connecting terminals supply power to the coil assembly to activate the main contactor and move the movable contact to the mated position.

10. The power distribution unit of claim 8, wherein the housing includes contact channels passing through one of the walls of the housing, the first and second pre-charge connection terminals being received in corresponding contact channels.

11. The power distribution unit of claim 1, wherein the main contactor driver is operated a predetermined time after the pre-charge driver is operated.

12. A power distribution unit comprising:
a housing having walls defining a main cavity and a secondary cavity;
a main contactor received in the main cavity of the housing, the main contactor including first and second fixed contacts and a movable contact movable between a mated position and an unmated position, the movable contact engaging the first and second fixed contacts to electrically connect the first and second fixed contacts in the mated position, the movable contact being separated from the first and second fixed contacts in the unmated position, the main contactor including a coil assembly energized to move the movable contact between the unmated position and the mating position;
a pre-charge assembly received in the secondary cavity of the housing, the pre-charge assembly including a pre-charge resistor and a pre-charge switch coupled to the pre-charge resistor and configured to be coupled to a pre-charge capacitor; and
a controller received in the housing, the controller including a trigger connector electrically coupled to a control circuit board, the trigger connector configured to receive a trigger signal from a vehicle controller, the controller including a main contactor driver for powering the main contactor, the controller including a pre-charge driver for powering the pre-charge switch, the controller including a microcontroller mounted to the control circuit board, the microcontroller being operably coupled to the main contactor driver and operably coupled to the pre-charge driver, wherein the microcontroller activates the pre-charge driver upon receiving the trigger signal to charge the pre-charge capacitor prior to activating the main contactor driver.

13. The power distribution unit of claim 12, wherein the pre-charge resistor and the pre-charge switch are mounted to the control circuit board.

14. The power distribution unit of claim 12, wherein the control circuit board includes a power circuit, the power circuit being electrically connected to the main contactor driver and being electrically connected to the pre-charge driver.

15. The power distribution unit of claim 12, wherein the pre-charge assembly includes first and second pre-charge connection terminals, the first pre-charge connection terminal coupled to the first fixed contact and coupled to the control circuit board, the second pre-charge connection terminal coupled to the second fixed contact and coupled to the control circuit board, the first and second pre-charge connection terminals being electrically coupled to the pre-charge driver, wherein the first and second pre-charge connection terminals supply power to the control circuit board for operating the pre-charge driver, and wherein the power distribution unit further comprises coil connecting terminals coupled to the coil assembly and coupled to the control circuit board, the coil connecting terminals being electrically coupled to the main contactor driver, the coil connecting terminals supply power to the coil assembly to activate the main contactor and move the movable contact to the mated position.

16. The power distribution unit of claim 15, wherein the housing includes contact channels passing through one of the walls of the housing, the first and second pre-charge connection terminals being received in corresponding contact channels.

17. The power distribution unit of claim 12, wherein the main contactor driver is operated a predetermined time after the pre-charge driver is operated.

18. A vehicle battery system comprising:
a high voltage battery pack having a positive battery terminal and a negative battery terminal;
an inverter configured to convert DC power from the high voltage battery pack to AC power for operating an electric motor of a vehicle; and
a power distribution unit between the high voltage battery pack and the inverter, the power distribution unit comprising:
a housing having walls defining a main cavity and a secondary cavity;
a main contactor received in the main cavity of the housing, the main contactor including first and second fixed contacts and a movable contact movable between a mated position and an unmated position, the movable contact engaging the first and second fixed contacts to close the main contactor and electrically connect the high voltage battery pack with the inverter, the movable contact being separated from the first and second fixed contacts in the unmated position to open the main contactor, the main contactor including a coil assembly energized to move the movable contact between the unmated position and the mating position;
a pre-charge assembly received in the secondary cavity of the housing, the pre-charge assembly including a pre-charge resistor and a pre-charge switch coupled to the pre-charge resistor and configured to be coupled to a pre-charge capacitor; and
a controller received in the housing, the controller configured to receive a trigger signal from a vehicle controller, the controller including a main contactor driver for powering the main contactor, the controller including a pre-charge driver for powering the pre-charge switch, the controller including a microcontroller operably coupled to the main contactor driver and operably coupled to the pre-charge driver, wherein the controller activates the pre-charge driver upon receiving the trigger signal to charge the pre-charge capacitor prior to activating the main contactor driver.

19. The vehicle battery system of claim 18, wherein the controller includes a power circuit, the power circuit being electrically connected to the main contactor driver and being electrically connected to the pre-charge driver.

20. The vehicle battery system of claim 18, wherein the pre-charge assembly includes first and second pre-charge connection terminals, the first pre-charge connection terminal coupled to the first fixed contact and coupled to the controller, the second pre-charge connection terminal coupled to the second fixed contact and coupled to the controller, the first and second pre-charge connection terminals being electrically coupled to the pre-charge driver, wherein the first and second pre-charge connection terminals supply power to the controller for operating the pre-charge driver, and wherein the power distribution unit further comprises coil connecting terminals coupled to the coil assembly and coupled to the controller, the coil connecting terminals being electrically coupled to the main contactor driver, the coil connecting terminals supply power to the coil assembly to activate the main contactor and move the movable contact to the mated position.

* * * * *